United States Patent [19]
Gross

[11] 3,794,898
[45] Feb. 26, 1974

[54] DYNAMIC BRAKING OF ELECTRIC MOTORS WITH THERMISTOR BRAKING CIRCUIT

[76] Inventor: Thomas A. O. Gross, Concord Rd. R.F.D., Lincoln, Mass. 01773

[22] Filed: Feb. 26, 1973

[21] Appl. No.: 335,686

[52] U.S. Cl.................. 318/380, 318/211, 318/258
[51] Int. Cl. ............................................. H02p 3/24
[58] Field of Search... 318/211, 212, 245, 258, 261, 318/269, 273, 369, 381, 471–473

[56] References Cited
UNITED STATES PATENTS

| | | | |
|---|---|---|---|
| 3,736,479 | 5/1973 | Soeda | 318/245 |
| 3,628,112 | 12/1971 | Gross | 318/380 X |
| 3,548,276 | 12/1970 | Gross | 318/380 X |
| 2,659,852 | 11/1953 | Trevitt | 318/380 X |

*Primary Examiner*—Harold Broome
*Assistant Examiner*—W. E. Duncanson, Jr.
*Attorney, Agent, or Firm*—William D. Roberson

[57] ABSTRACT

A motor system for energizing and deenergizing an electric motor and for dynamically braking the motor to a halt after deenergization. When the motor is turned off, a dynamic braking circuit is connected in series with the motor windings to assure generator action and to provide for dissipation of the kinetic energy of the motor. The braking circuit incorporates a thermistor through which braking currents flow. Because of its comparatively high resistance at ambient temperatures the thermistor opposes high surge currents at the initiation of braking, thereby reducing arcing at the motor brushes when the kinetic energy of the motor is highest. As the motor decelerates, the resistance of the thermistor reduces automatically because of self-heating, thereby maintaining large currents in the braking circuit to bring the motor quickly to a halt.

12 Claims, 2 Drawing Figures

DYNAMIC BRAKING OF ELECTRIC MOTORS WITH THERMISTOR BRAKING CIRCUIT

BACKGROUND OF THE INVENTION

A familiar technique for rapid stopping of electric motors involves the connection of the motor windings with a switch in such a way that, after disconnection of the motor from its source of power, the motor is caused to generate electrical power, the generated power being dissipated in resistance within the motor circuit. For example, a series-connected universal motor operating from an AC source can be made to generate DC by disconnecting the motor from the source and by shorting an inverted field winding across the armature winding. If the motor is sufficiently large to meet a critical efficiency requirement and if the circuit is not interrupted during the portions of the current cycle when the magnetic flux passes through zero, the conditions for generation are satisfied and the inertial energy stored in the motor rotor and the load are rapidly dissipated by ohmic losses of the generated electric power. The armature brakes to a halt.

Surge currents created on the initiation of the braking or generating mode can frequently be as high as an order of magnitude larger than the running current in the motor mode. High surge currents can cause severe brush erosion and may tend to produce undesireable braking jolts. The obvious way to reduce surge currents is to introduce resistance into the braking circuit. However, if sufficient resistance is added to the circuit in the generator mode to reduce the generated surge current to a level approaching that of the running current, the period required to bring the motor to a halt is greatly lengthened. For the improvement of braking efficiency in some motor braking circuits, extraordinary steps have been taken to reduce circuit resistance, as by the use of motor brushes of especially low resistance. This, however, encourages commutator arcing and fouling, and ultimately promotes that high-resistance brush-commutator condition which decreases braking efficiency and can lead to the complete failure of dynamic braking.

The consequences of a braking system failure can be very serious. For example, one important application of dynamic braking systems for electric motors is in connection with power-operated hand tools. It is a definite safety feature for a power-operated hand tool to be brought to a sudden stop after it is turned off. Some, but unfortunately not many, power-operated hand saws are equipped with dynamic braking circuits. A powerful hand saw with its blade still coasting after deenergization of the saw motor can be a dangerous instrumentality. Desirably, after the saw motor is turned off, the blade should halt within a very few seconds. A user of such a saw, relying on its braking characteristics, may find in that statistical number of cases when the braking system fails, that the still-coasting saw blade is more dangerous to him personally than it would have been if the motor had not been equipped with a brake. Reliability of the braking circuit is therefore most important.

In my U.S. Pat. No. 3628112 issued 14 Dec. 1971 and titled Dynamic Braking Of Electric Motors With Load Changing During Braking were described systems automatically responsive to braking currents for reducing the resistance in the braking circuit while the motor is decelerating. It was there pointed out that to reduce the braking interval as much as possible would require a very low value of resistance to encourage high braking currents. But to minimize arcing between the commutator and brushes a higher value of braking resistance is indicated. These competing considerations can be balanced by starting the braking interval with a higher value of resistance in the braking circuit and reducing the resistance as the motor speed declines as a first approximation to a constant current braking system as set forth in the aforesaid U. S. patent.

BRIEF SUMMARY OF THE INVENTION

In the practice of this invention a motor is equipped with a generative braking circuit incorporating a thermistor as an important part of the resistance therein. The thermistor has an inherent resistance value which is relatively high at the initiation of braking currents therein, thus minimizing arcing between the commutator and brushes at the initiation of braking. The braking currents, however, cause self-heating of the thermistor with a consequent automatic reduction in the resistance of the thermistor and, hence, of the braking circuit. As the energy of the motor is dissipated in the braking circuit while the speed of the motor declines, the total resistance of the braking circuit also declines to shorten the total braking interval.

INTRODUCTION OF THE DRAWINGS

FIG. 1 is a circuit diagram of an improved and preferred motor-control system constructed in accordance with this invention and incorporating an automatic thermistor-controlled load-reducing braking load; and FIG. 2 is a graph showing the temperature-dependent resistance of a thermistor and a resistance network incorporating a thermistor.

DETAILED DESCRIPTION

Figure 1:
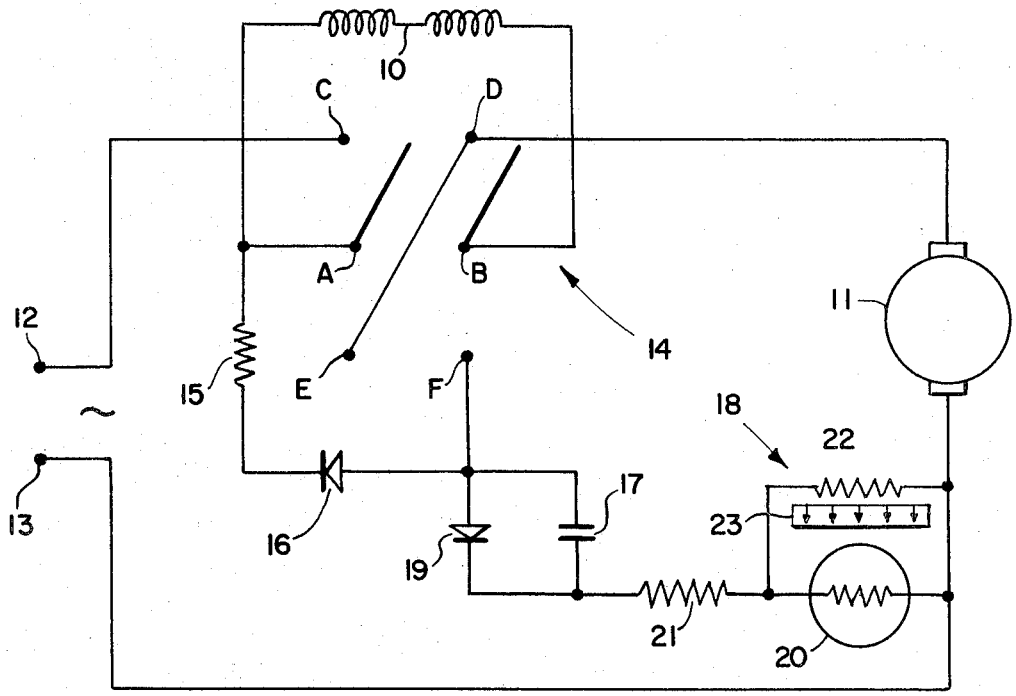

The motor control system represented in FIG. 1 comprises a series-connected universal motor having a stator winding 10 and a commutated rotor winding 11. The motor is preferably of that type known as a universal motor, which may be powered either by AC or by DC and which is capable of generating DC with appropriate connection of the windings when the rotor or armature is driven by an external source of power or by its own inertia. The motor windings are connectable in series across a source of alternating current represented by terminals 12 and 13 by means of a double-pole double-throw switch 14. The motor is energized and running when the movable contacts A and B of switch 14 are switched to the upper position contacting fixed contacts C and D respectively. Under these conditions a continuous series circuit can be traced through terminal 12, contacts C and A of switch 14, field or stator winding 10, rotor winding 11, and terminal 13.

When the motor is thus energized, a control circuit is also connected across terminals 12 and 13. In this embodiment of the invention the control circuit comprises, in immediate series circuit, a current-limiting resistance 15, a unilaterally conductive device such as diode or rectifier 16, an energy storage device represented by capacitor 17 and a resistance network 18. A shunt circuit across capacitor 17 includes another unilaterally conductive device shown as diode 19. Diode 19 is poled in opposition to the polarity of diode 16. This part of the control circuit is connected in series from terminal A of switch 14 to that side of the line connected to terminal 13.

It is in the resistance network 18 that will be found a distinguishing feature of the present invention. This network incorporates a thermistor 20; that is to say, a resistor having a negative temperature coefficient of resistance. Such a thermistor possesses a relatively high resistance at ambient temperature and a relatively low resistance at elevated temperatures. Associated with thermistor 20 is a series resistor 21 and a shunt resistance 22, the effects of which are described hereinafter.

As examples of components useful in the preferred form of the invention illustrated in FIG. 1, in association with a 1.5 horsepower universal motor intended for energization by 120 volts at 60 Hz. and drawing a nominal load current of 13 amperes, the following are suggested as appropriate:

Thermistor 20 — Fenwal ZB 11 J1
Resistor 21 — 0.5 ohm, 12 watts
Resistor 22 — 15 ohms, 2 watts
Resistor 15 — 150 ohms, ¼ watt
Capacitor 17 — 15 mfd, 150 volts
Diode 16 — 1N 5060
Diode 19 — 1N 5624

When the motor is switched on initially with the movable contacts A and B of switch 14 in their upper or ON position, capacitor 17 is charged by the unidirectional current through diode 16. The current-limiting resistor 15 limits the initial peak-charging current to less than an ampere with the circuit values given. The potential across the capacitor 17 reaches its full value of approximately 150 volts in a few cycles of the AC supply. Diode 19 is essentially inactive during the entire time that the motor is energized from the source, being reverse biased by the potential on capacitor 17.

When the switch 14 is switched to the OFF position with the movable contacts A and B connected to stationary contacts E and F respectively, the motor operates in a generator mode for dynamic braking. Because of the cross connection between contacts D and E, the stationary winding 10 is connected in phase reversed relationship and in series with the rotor winding 11, and with portions of the control circuit. When this happens the potential across the capacitor 17 causes an increase in current through the motor windings. This current is initially determined in part by the potential on the capacitor 17 and the field inductance of the motor windings. In the example given, less than one millisecond is required for generation to occur. A generated surge current is produced which flows through the capacitor 17 and resistance network 18 until diode 19 is forward biased. Thereafter diode 19 becomes conductive and practically all of the generated surge current flows through diode 19, bypassing the capacitor 17. The energy stored in the capacitor 17 can be very small relative to the stored mechanical energy in the system, as described in my U. S. Pat. No. 3,548,276 issued on 15 December 1970 for improvements in Dynamic Braking of Universal Motors.

The magnitude of the surge current generated immediately upon switching the motor to its generator mode for dynamic braking is, of course, limited by the impedance in the dynamic braking circuit, in this case resistance network 18. The value of the dynamic braking resistance is a compromise between a desire to minimize brush-commutator arcing and the need to bring certain types of motors to a prompt halt. As soon as the generator or braking mode is initiated the brush current might tend to become very high with a concommitant high-stopping torque. When the motor speed drops to just below one-third speed, 90 percent of its mechanical energy has been dissipated, but because the current then might have a relatively low value the motor would continue to rotate for a considerable period. In wound field motors the time required to reach a halt from 30 percent speed is generally greater than the time to reach 30 percent speed from 100 percent. Permanent magnet field motors have relatively greater slow speed stopping torque, but this invention is equally valuable to both wound-field and permanent magnet motors.

A constant current braking resistor would be an ideal load for power tool brakes because the stopping torque would be constant and the brush-commutator damage would be minimized for a given stopping time. The circuit of FIG. 1 approximates a constant current load by automatically reducing the value of the resistance in the braking circuit during the braking cycle. At a normal ambient temperature of 20° C. the thermistor 20 has a resistance of approximately 10 ohms. and thus assumes more than half the value of the initial braking currents. These currents cause self-heating of the thermistor, thereby reducing its resistance and, thus, the resistance of the network 18. The thermistor then takes an increasing proportion of the braking currents as its temperature rises and its resistance declines. Its resistance may, for example, become less than 0.5 ohms at 150° C. The result of the use of the thermistor in the braking circuit is to flatten the crest of the wave shape of the braking current, reducing its peak amplitude and prolonging the period of maximum current.

In the preferred example illustrated in FIG. 1, the resistance elements 21 and 22 also perform active functions. The shunt resistor 22 prevents the circuit resistance from becoming too high at very low ambient temperatures. The series resistor 21, on the other hand, moderates the high temperature effects of the thermistor by absorbing most of the energy of the braking currents when the resistance of the thermistor becomes very low.

Figure 2:
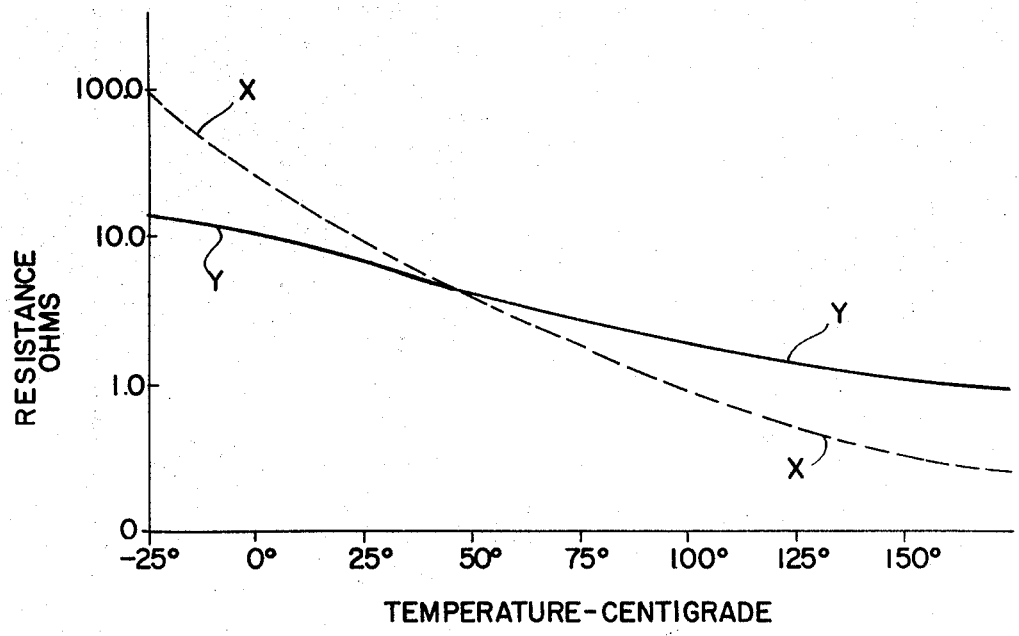

These effects are illustrated in FIG. 2, which shows the effects of temperature on the braking circuit resistance values. Curve X represents the resistance of a thermistor (N. L. Industries Type 2D754) over a temperature range from −25° C to +150° C. At the low end of the scale the thermistor resistance is 100 ohms; at +25° C the thermistor resistance value is 10 ohms and it drops to 0.3 ohm at 150° C. Curve Y shows the combined resistance of a network incorporating the same thermistor with a shunt resistor of 15 ohms and a series resistor of 0.75 ohm. At −25° C the network resistance is just under 15 ohms. The two curves cross at 50° C at a resistance value of about four ohms, and the high temperature resistance of the network is approximately one ohm at 150° C.

An examination of these curves shows that at very low temperatures the braking effect might be severely inhibited by the thermistor alone without a resistive shunt to reduce the overall resistance value in the circuit. The series resistance on the other hand creates an inherent self-regulating effect to prevent the thermistor from becoming too hot, particularly as a result of repeated braking cycles in a short interval with little time for the thermistor to cool off. At intermediate temperatures most of the braking energy dissipated by the thermistor itself, whereas at higher temperatures with lower thermistor resistance the braking energy is shifted to the series resistor 21.

The circuit of FIG. 1 incorporates an additional feature useful at very low temperatures where the thermistor resistance may be so high that it may not participate fully in the braking cycle. Represented at 23 is a thermal bond between shunt resistor 22 and thermistor 20. This permits energy dissipated by resistor 22 to transfer to the thermistor heating it indirectly. This creates a new temperature condition for the thermistor, particularly during successive braking cycles, by warming the thermistor to a higher-than-ambient initial temperature. The series resistor 21 should not participate in any such thermal exchange. Where the thermal bond is employed, the extrinsic heat sink for thermistor cooling should be on the opposite side of the thermistor from the shunt resistor.

DESIGN CONSIDERATIONS

In braking circuits constructed according to this invention, the system should be designed to balance the intrinsic and extrinsic thermal characteristics associated with the thermistor. The intrinsic thermal characteristics are those involving the heat capacity of the thermistor itself and the braking energy which it is required to absorb. The extrinsic thermal characteristics are those of the thermistor environment, its temperature and its cooling capacity. The two should be carefully related, for to obtain the desired resistance characteristics of the thermistor in a given braking system requires a high energy density in a comparatively small device with little surface area available for cooling the device.

To bring the motor system to halt as quickly as possible without exceeding reasonable limits on motor brush currents or torque peak, the thermistor should be engineered to yield a reasonable constant brake current over a large part of the stopping interval. Most thermistor materials should not exceed a temperature of about 150° C. Above this point irreversible aging effects may accelerate and alter the designed characteristics of the thermistor. An optimum design would bring such a thermistor to 150° C. at the final moment of motor braking, thereby producing the maximum change in thermistor resistance. It can be assumed generally that negligible cooling of the thermistor can take place during the relatively short brake cycle.

If the braking cycle is to function reliably and repeatedly in a short period of time, extrinsic factors need to be balanced carefully. The thermistor may have to be cooled quickly for the next braking cycle. For this purpose a wafer-shaped thermistor may be cemented in intimate thermal contact with a relatively massive aluminum base. The assembly should have sufficient heat capacity to absorb the energy of several stops in rapid succession. In some installations the thermistor may even be immersed in a volatile liquid if especially rapid cooling is called for.

A typical seven inch hand-held circular power saw may have about 850 Joules of kinetic energy when running at full speed. If the thermistor load element is near room temperature at commencement of braking it will absorb about one-third of this energy. The remainder is dissipated in other circuit resistances and in mechanical losses such as windage. For efficient utilization of the thermistor material it should reach maximum safe operating temperature at the end of each brake cycle. The resultant large swings in resistance can be diluted with conventional resistors which can dissipate heat less expensively and which can protect the thermistor. As the thermistor temperature rises an increasing fraction of the brake energy is dissipated by the fixed series resistance.

Low resistance materials suitable for brake thermistors have an intrinsic heat capacity of approximately 3.8 Joule/ degree C/ cubic centimeter. The Fenwal ZB1lJ1 is a one inch diameter disc with a volume of 0.875 cc; its heat capacity is 3.3 Joules/ degree C. A temperature rise on the order of 85° can be expected in this application. The resistance will drop from 10 ohms at room temperature to about 0.7 ohms at the conclusion of the brake cycle. Another thermistor load which has been found to be useful for somewhat larger motors consists of a pair of Fenwal WB12W1 washers in parallel. The volume of the pair is 1.19 cc giving an intrinsic heat capacity of 3.93 Joules/degree C. These may be operated for short periods up to 200° C. A 175° temperature excursion from room temperature drops the resistance from 10 ohms to 0.13 ohms and absorbs nearly 900 Joules.

Although the thermistor cannot be damaged in a properly designed circuit, an abusive frequency of Start-Stop cycles may not allow the resistance to recover in time to prevent excessive brush arcing. The one inch disc thermistor bonded on one side to a metal surface with an epoxy resin such as Delta Bond No. 152 Thermal Adhesive supplied by Wakefield Engineering Inc. can recover to five ohms within six seconds.

While I have chosen to illustrate a single embodiment of the invention, it should be clear that this embodiment is not limiting on the scope of the invention, but is illustrative of a broader field of application. For example, although the preferred example incorporates the invention described and claimed in my aforesaid U. S. Pat. No. 3548276 having to do with a diode-bypassed capacitor in a braking circuit for universal motors, it should be well understood that the practice of this invention does not require the use of the other. Indeed this invention is not even limited to use with universal motors, since it can be practiced in connection with any electrical motor capable of operating in a generator mode, including even permanent magnet field motors. Some embodiments may require more than one thermistor element connected in parallel, in series or both.

When braking circuit thermistors are connected in parallel, it may be desireable to include current-equalizing means in the circuit. The reason for this is that one of two parallel-connected, self-heated thermistors may acquire a lower resistance than the other, thereby causing the braking currents to divide unequally between the two thermistors. This causes an increasing share of braking currents to flow through the thermistor of lower resistance, thereby defeating the design intention. Current-equalizing means would minimize this tendency by forcing nearly equal currents to flow in both the higher and lower resistance thermistors.

The series resistor 21 may not be necessary as a separate element in motor circuits which already possess a given minimum value of inherent resistance. The shunt resistor 22, on the other hand, may be dispensed with in systems not subjected to low temperatures. Similarly, the thermal bond 23 between shunt resistor 22 and the thermistor may not be ncessary in all applications. These features in combination nevertheless are useful to broaden the range of operating conditions under which the invention may be successfully practiced.

These and other variations are intended to be encompassed by the appended claims.

I claim:

1. A dynamically braked motor system comprising:
an electric motor operable both in a motor mode and in a generator mode;
supply terminals connectable to a source of electrical power;
switching means for controlling the connection of said motor to said supply terminals;
means made operative upon disconnection of said motor from said supply terminals for completing a dynamic braking circuit with said motor, said dynamic braking circuit including at least one thermistor self-heated by currents in said braking circuit to reduce the value of the resistance in said braking circuit in response to the dissipation of braking energy therein.

2. A control system for energizing and for dynamically braking an electric motor operable both in a motor mode and in a generator mode comprising:
supply terminals connectable to a source of electrical power;
switching means for controlling the connection of such a motor to said supply terminals;
current-limiting means including at least one thermistor having a negative temperature coefficient of resistance such that said current limiting means exhibits a declining resistance characteristic in response to the flow of self-heating currents therein; and
means made operative upon disconnection of such electric motor from said supply terminals for completing a dynamic-braking circuit with such motor through said current-limiting means, whereby the value of the resistance in said braking circuit is automatically reduced from an initial value to lower values during the operative period of said braking circuit.

3. The system of calim 2 wherein said current-limiting means includes at least one additional discrete resistor connected in series with said thermistor in said braking circuit.

4. The system of claim 2 wherein said current-limiting means includes at least one further discrete resistor connected in shunt with said thermistor in said braking circuit.

5. The system of claim 4 wherein a thermal bond is provided between said further discrete resistor and said thermistor to cause heating of said thermistor by braking currents in said further discrete resistor.

6. The system of claim 2 wherein means are provided for cooling said thermistor subsequent to said braking interval.

7. The system of claim 2 wherein said current-limiting means is a resistive network including at least one additional discrete resistor connected in series with said thermistor and at least one further discrete resistor connected in parallel with said thermistor in said braking circuit.

8. A control system for energizing and for dynamically braking an electric motor which is capable of generating electric currents, said system comprising:
supply terminals connectable to a source of currents;
switching means for controlling the connection of such a motor to said supply terminals;
current-limiting impedance means;
means made operative upon disconnection of such motor from said supply terminals for completing a dynamic-braking circuit through such motor and said impedance means; and
load-reducing means comprising a thermistor self-heated by currents in said braking circuit and responsive to the dissipation of a predetermined quantity of energy by said braking circuit for reducing the value of the impedance in said braking circuit, thereby to reduce the total braking interval.

9. A control system for energizing and for dynamically braking an electric motor which is capable of generating electric currents, said system comprising:
supply terminals connectable to a source of electrical power;
switching means for controlling the connection of such motor to said supply terminals;
means made operative upon disconnection of such motor from said supply terminals for completing a dynamic-braking circuit through such motor, said dynamic braking circuit including at least one thermistor self-heated by currents in said braking circuit for presenting a higher resistance to said currents upon the initiation of braking and thereafter a reduced level of said resistance in response to the dissipation of energy by said braking circuit.

10. The system of claim 9 wherein said dynamic braking circuit comprises a resistive network of which said thermistor is a part, said network including a shunt resistor connected in parallel with said thermistor.

11. The system of claim 9 wherein said dynamic braking circuit comprises a resistive network of which said thermistor is a part, said network including a series resistor connected in series with said thermistor.

12. The system of claim 9 wherein said dynamic braking circuit comprises a resistive network of which said thermistor is a part, said network including a series resistance in series with said thermistor to dissipate an increased share of braking energy when said thermistor is at elevated temperatures, and a shunt resistance in parallel with said thermistor to reduce the resistance of said network at low temperatures; said system further comprising a thermal bond between said shunt resistance and said thermistor to warm said thermistor at especially low temperatures by virtue of braking currents in said shunt resistance, and means for cooling said thermistor subsequent to the braking interval to restore said system rapidly to a pre-braking condition.

* * * * *